Patented Feb. 19, 1935

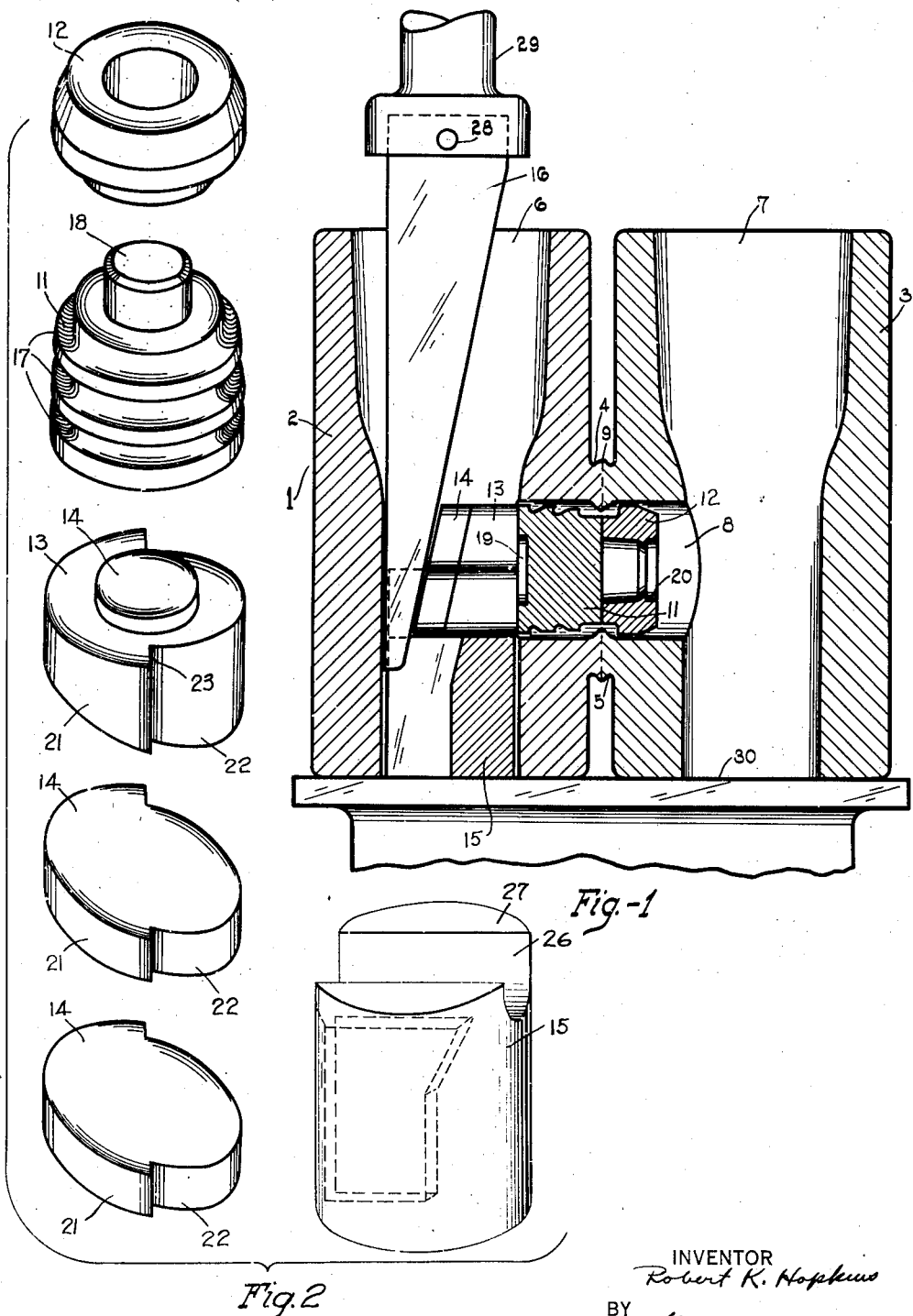

1,991,937

UNITED STATES PATENT OFFICE 1,991,937

BROACHING APPARATUS

Robert K. Hopkins, New York, N. Y., assignor to
M. W. Kellogg Co., New York, N. Y., a corporation of Delaware Application December 5, 1932, Serial No. 645,684

10 Claims. (Cl. 90—33)

This invention relates to the broaching of the walls of passageways and in particular to the broaching of the walls of passageways which are not directly accessible from the exterior of the articles in which they occur.

Although my invention is of general application, it will for convenience be considered in connection with the broaching of headers, such as are used in making up tube stills for the cracking of petroleum oil, to remove the welding flash therefrom.

A practical method for making up the headers just mentioned includes uniting two cylindrical members, each being provided with a suitable tubular projection, by electric flash resistance welding to form a unitary structure having an H-shaped passageway therethrough. By reason of the electric flash resistance welding, metal is upset on the outside and on the inside of the tubular projections at their joint so that the passageway defined by them, that is, the passageway connecting the main branches of the H, is materially restricted intermediate its ends. The outside upset metal, or outside flash, offers no difficulty in its removal since it is readily accessible. However, the inside upset metal, or inside flash, is difficult to remove since the connecting passageway is not directly accessible from the outside of the header. It has been the prior practice to perforate one of the cylindrical members opposite the connecting passageway so that a broaching tool can be inserted into the connecting passageway and the flash removed, the perforation being of course closed in any desired manner after the broaching tool is removed. This procedure has not been satisfactory since it unnecessarily increases the manufacturing cost of the headers and tends to weaken them.

My invention contemplates a broaching apparatus for carrying out said method by means of which the inside flash may be removed from the headers quickly and cheaply without need of perforating the header walls or otherwise weakening the headers.

Other objects and advantages of my invention will readily be appreciated from a consideration of the following description taken together with drawing forming a part of this application, in which:

Fig. 1 is a part sectional view showing the broaching apparatus of this invention positioned in a header of the type above mentioned, and Fig. 2 is a perspective view of various parts of the broaching apparatus.

The header 1 is shown as it appears after the flash resistance welding and just before the broaching operation. Header 1 comprises cylindrical members 2 and 3 whose tubular extensions 4 and 5 are joined by the flash resistance welding to form the unitary structure. The H-shaped passageway of header 1 is made up of the main branches 6 and 7, respectively in members 2 and 3, and connecting passageway 8, in tubular extensions 4 and 5. Around the outside of the joint of tubular extensions 4 and 5 is the outside flash 9, and around the inside of the joint of tubular extensions 4 and 5 is the inside flash 10.

The broaching apparatus includes a cutting member 11, aligning members 12 and 13, spacing members 14, a guide plug 15, and a wedge-shaped force applying member 16. Cutting member 11 has its surface stepped to provide a plurality of cutting elements 17, three being shown, of progressively decreasing diameter, the cutting element of maximum diameter being of substantially the same diameter as the unrestricted portions of passageway 8. The end of cutting member 11 adjacent element 17 of minimum diameter is reduced to form a tapered extension 18, the other end is bored to provide recess 19. Aligning member 12 includes a middle cylindrical portion of diameter substantially equal to the diameter of passageway 8, one end portion tapers away from the cylindrical portion and the other end portion is reduced to the size of the end of cutting member 11 that carries tapered extension 18. Aligning member 12 is bored from the end portion just mentioned to provide a tapered hole of a size to accommodate tapered extension 18 and from the other end it is bored to provide a straight sided hole. These holes are separated by a shoulder 20 which acts to limit the movement of extension 18 in the tapered hole.

Aligning member 13 is made up of two semi-cylindrical portions 21 and 22 connected by shoulder forming flat surface 23. The diameter of portion 21 is substantially equal to the diameter of passageway 8 and the diameter of portion 22 is smaller than the diameter of passageway 8, however, the centers of generation of portions 21 and 22 are spaced apart so that the diameter of member 13 on a line passing through its center at right angles to shoulders 23 is substantially equal to the diameter of passageway 8. One end of member 13 is reduced to form a cylindrical extension 24 of a size to fit in recess 19. The other end of member 13 is flat and is cut at an angle. Spacing members 14 are similar in shape to member 13 and have both of their ends flat and cut at the same angle as said other end of member 13.

Guide plug 15 is cylindrical in shape and of a size to fit in the bottom portion of cylindrical member 2. The height of plug 15 is such that it extends from the bottom of passageway 6 to about the center line of passageway 8. A slot 25 extends from one side of plug 15 to about its middle and is of a size to accommodate wedge 16. The top of plug 15 has a semi-cylindrical recess 26 therein of a size to accommodate portion 22 of aligning member 13 and spacing members 14. Extending from recess 26 are shoulders 27 which serve to support aligning member 13 and spacing members 14 and permit aligning member 13 and spacing members 14 to slide thereon. Force applying wedge 16 has a hole 28 at its top for connection to the ram 29 of a press or other force applying means. The angular side of wedge 16 is cut at the same angle as the sides of spacing members 14 and said other side of aligning member 13.

In carrying out the method of my invention header 1 after the flash resistance welding is placed, as shown on Fig. 1, on the platen 30 of a press. Cutting member 11 is then inserted into passageway 8 through passageway 6 so that the cutting element 17 of minimum diameter faces flash 10. Aligning member 12 is then inserted into the other end of passageway 8 through passageway 7 and moved towards cutting member 11 until extension 18 seats in the tapered recess. Plug 15 is next put in position with the axis of recess 26 substantially parallel with the axis of passageway 8. After that is done, aligning member 13 is positioned on plug 15 and moved towards cutting member 11 until extension 24 fits into recess 19. At the end of this step cutting member 11 is properly aligned and supported for the desired broaching operation. The necessary number of spacing members 14 is then placed on shoulders 27 and wedge 16 connected to ram 29 of the press and the press set in operation.

As ram 29 and wedge 16 descend the vertical face of wedge 16 meets the side of member 2 and the inclined face meets the face of the spacing member 14. This results in spacing members 14, aligning member 13, cutting member 11 and aligning member 12 being moved axially along in passageway 8. In displacing the broaching elements just mentioned the vertically directed force of the ram is resolved into two components, one the horizontal force which moves the broaching member axially and another which pushes spacing members 14 and aligning member 13 into contact with shoulders 27 of plug 15. The reaction of the horizontal component is taken up by the wall of member 2 against which wedge 16 contacts, the reaction of the other component is taken up through plug 15 by the platen 30 of the press.

As ram 29 continues its downward travel the first of cutting members 17 comes into contact with flash 10 and removes a portion thereof to increase its diameter. After this has happened wedge 16 which has approached platen 30 is retracted and another spacing member 14 added to the one previously put in place on plug 15. Ram 29 and wedge 16 are again moved downward to further axially displace the broaching element. As this further movement goes on the second and third of the cutting elements 17 successively come into contact with flash 10 and substantially completely remove it so that after the third of elements 17 has passed flash 10 passageway 8 will be of substantially uniform diameter. Ram 29 and wedge 16 are again retracted and the broaching elements removed. Although I have described the method as carried out in two downward movements of wedge 16, it is obvious that the cutting away of flash 10 may be accomplished in a single movement or in more than two movements.

I claim:

1. A broaching tool comprising a body portion having a cutting edge and engageable means at each end thereof, a pilot member adapted to engage the engageable means at the front end of said body portion for the purpose of guiding the tool during the broaching operation, and a force transmission member adapted to engage the engageable means at the rear end of said body portion having a bevelled outer surface adapted to be engaged by a wedge for forcing the tool through an opening to be broached.

2. A broaching tool comprising a body portion having a cutting edge and a depression in one end thereof, a centrally disposed projection at the opposite end of the body portion, a pilot member adapted to be fitted over the projection for the purpose of guiding the tool during the broaching operation, and a force transmission member having a projection engageable in the recess of the body portion and having a bevelled outer surface adapted to be engaged by a wedge for forcing the tool through an opening to be broached.

3. A broaching tool comprising a body portion having a series of circumferentially arranged cutting edges and a depression in one end thereof, a tapered centrally disposed projection at the opposite end of the body portion, a pilot member adapted to be fitted over the projection for the purpose of guiding the tool during the broaching operation, and a force transmission and cutter body aligning member having a projection engageable in the recess of the body portion and having a bevelled outer surface adapted to be engaged by a wedge for forcing the tool through an opening to be broached.

4. A broaching tool comprising a body portion having a series of circumferentially arranged cutting edges gradually increasing in diameter from the forward toward the rear end of the body and a depression in the rear end thereof, a tapered centrally disposed projection at the forward end of the body portion, a member adapted to be fitted over the projection for the purpose of guiding the tool during the broaching operation, and a force transmission member having a projection engageable in the recess of the body portion and having a bevelled outer surface adapted to be engaged by a wedge for forcing the tool through an opening to be broached, said pilot member being of substantially the same diameter as the diameter of the rearmost cutting edge on the body portion.

5. Apparatus for broaching a relatively inaccessible connecting bore between exteriorly opening passageways in structures comprising a broaching device insertable into the bore through one of the passageways, means adapted to be positioned within the bore for maintaining said broaching device axially aligned therein, and means for effecting movement of the broaching device within the bore so as to remove material from the wall thereof, said means for effecting the movement of the broaching device, when the apparatus is assembled for operation, being arranged within the passageway through which the device has been inserted into the bore and being movable in a path axially of the passageway for causing the broaching action of the device.

6. Apparatus for broaching a relatively inaccessible connecting bore between exteriorly opening passageways in structures comprising a broaching device insertable into the bore through one of the passageways, pilot means adapted to be positioned within the bore for guiding the broaching device axially within the bore, and means for effecting movement of the broaching device within the bore so as to remove material from the wall thereof, said means for effecting the movement of the broaching device, when the apparatus is assembled for operation, being arranged within the passageway through which the device has been inserted into the bore and being movable in a path axially of the passageway for causing movement of the broaching device, said broaching device being formed as a body portion having a circumferentially arranged cutting edge and a depression in one end, the broaching device further being provided with an extension at the end opposite to the depression and the pilot means being connected to the body portion by being fitted over said extension.

7. Apparatus for broaching a relatively inaccessible connecting bore between exteriorly opening passageways in structures comprising a broaching device insertable into the bore through one of the passageways, pilot means adapted to be positioned within the bore and connected to the forward end of the device for guiding the same as it is moved within the bore, force transmitting means connected to the rear end of the device, and means adapted to contact with the force transmitting means for effecting movement of the broaching device within the bore so as to remove material from the wall thereof, said means for effecting the movement of the broaching device, when the apparatus is assembled for operation, being arranged within the passageway through which the device has been inserted into the bore and being movable in a path axially of the passageway for causing the broaching action of the device, the said broaching device being formed of a body portion having a series of circumferentially arranged cutting edges.

8. Apparatus for broaching a relatively inaccessible connecting bore between exteriorly opening passageways in structures comprising a broaching device insertable into the bore through one of the passageways, pilot means detachably connected to said broaching device for guiding the same in its movement within the bore, force transmitting means arranged to contact with the support and the broaching device, and means for applying force to move the force transmitting means to thereby effect movement of the broaching device within the bore so as to remove material from the wall thereof, said means for effecting the movement of the broaching device, when the apparatus is assembled for operation, being arranged within the passageway through which the device has been inserted into the bore.

9. Apparatus for broaching a relatively inaccessible connecting bore between exteriorly opening passageways in headers and the like comprising a platen for contacting the header and closing an opened end of one of the exteriorly opening passageways, a support insertable into the bottom of the last mentioned passageway in a position to bear against the platen, said support having an axial slot and a concaved upper portion and being of such lengths as to extend from the platen to the connecting bore with the bottom of said concaved portion lying within a plane so as to effect the formation of a continuation of the wall of the bore, aligning means including two members one of which is insertable into the bore through another of the exteriorly opening passageways and the other of which is positionable on said concaved portion of said support, a movable cutter member positionable between the aligning members for broaching the connecting bore upon being forced therethrough, said aligning member positionable on the support having its end remote from the cutter member angularly disposed to the axis of the passageway housing the support, and a force applying wedge insertable in the passageway having one face adapted to contact with the angular end of said aligning member and having its other face adapted to contact with the wall of said passageway whereby the longitudinal movement of the wedge toward the platen will cause the cutter member to broach the connecting bore.

10. Apparatus for broaching a relatively inaccessible connecting bore between exteriorly opening passageways in headers and the like comprising a platen for contacting the header and closing an opened end of one of the exteriorly opening passageways, a support insertable into the bottom of the last mentioned passageway in a position to bear against the platen, said support having an axially arranged slot and a concaved upper portion and being of such length as to extend from the platen to the connecting bore with the bottom of said concaved portion lying within a plane so as to effect the formation of a continuation of the wall of the bore, aligning means including two members one of which is insertable into the bore through another of the exteriorly opening passageways and the other of which is positionable on said concaved portion of said support, a movable cutter member positionable between the aligning members for broaching the connecting bore upon being forced therethrough, said aligning members including means for supporting the cutter member, the aligning member positionable on the support having its end remote from the cutter member angularly disposed to the axis of the passageway housing the support, a force applying wedge insertable in the passageway having one face adapted to contact with the angular end of said alining member and having its other face adapted to contact with the wall of said passageway whereby the longitudinal movement of the wedge toward the platen will cause the cutter member to broach the connecting bore, and spacer members positionable on said support between the aligning member and the wedge, which spaced members are so shaped that their ends are at substantially the same angle to the axis of the passageway as the angular end of the said aligning member whereby the spaced members may be positioned between the wedge and the aligning member to increase the path of movement of the cutter member upon the further operation of the wedge.

ROBERT K. HOPKINS.